United States Patent [19]

Kawai et al.

[11] Patent Number: 4,941,169
[45] Date of Patent: Jul. 10, 1990

[54] X-RAY PHOTOGRAPHIC EQUIPMENT

[75] Inventors: Masumi Kawai; Hiroshi Sawada, both of Kyoto, Japan

[73] Assignee: Shimadzu Corporation, Kyoto, Japan

[21] Appl. No.: 286,825

[22] Filed: Dec. 20, 1988

[30] Foreign Application Priority Data

Jul. 31, 1987 [JP] Japan .................................. 62-193248

[51] Int. Cl.$^5$ .............................................. H05G 1/64
[52] U.S. Cl. ........................................ 378/99; 378/62; 358/111
[58] Field of Search ............................ 378/99, 98, 62; 358/111

[56] References Cited

U.S. PATENT DOCUMENTS 4,723,261  2/1988  Janssen et al. ......................... 378/99

Primary Examiner—Carolyn E. Fields
Assistant Examiner—David P. Porta
Attorney, Agent, or Firm—Griffin Branigan & Butler

[57] ABSTRACT

An X-ray photographic equipment includes an assembly consisting of an X-ray tube and an X-ray image pickup means with the body of a subject disposed therebetween. The assembly is moved relative to the body of the subject along the direction of a contrast medium flowing in the body of the subject. A plurality of images are obtained every time the assembly is stopped. Video signals representing these images are processed, and a maximum value holding image and a minimum value holding image are found. A difference therebetween represents an image of the blood vessel, which is free from an artefact caused by positional deviation.

11 Claims, 1 Drawing Sheet

X-RAY PHOTOGRAPHIC EQUIPMENT

BACKGROUND OF THE INVENTION

The present invention relates to an X-ray photographic equipment in which an X-ray television is utilized, and more particularly to an X-ray photographic equipment for carrying out digital subtraction angiography (DSA) in which video signals to be processed are digitalized.

When a subject is to undergo DSA in two or more areas of his body, and when these areas are disposed along the direction of flow of a constrast medium, it is most common to carry out DSA with either of the following two techniques, in either of which the constrast medium has only to be injected once for all so as to avoid a cardiodynamic burden which would be imposed on the heart of the subject if the constrast medium were injected in each area:

The first technique comprises the steps of taking a pre-constrast image in one area after another, injecting a contrast medium, taking a contrast image in one area after another, and subtracting the pre-contrast image from the contrast image for each area. A difference obtained from this subtraction represents an image of the contrast medium alone, i.e. an image of the blood vessel alone, the background of which has vanished. Twice in all, an examination table, on which the subject is lying, is moved relative to an image pickup system including an X-ray tube, i.e. once before the injection of the contrast medium and once after the injection thereof.

The second technique begins with taking a pre-contrast image in an area disposed at the upstream side of the flow of a contrast medium. The pre-contrast image is taken before the contrast medium reaches the area. Subsequently, when the contrast medium reaches the area, a contrast image is taken in that area. Then an area disposed at the downstream side is allowed to come into view of the image pickup system, and a pre-contrast image is taken in that area before the contrast medium reaches the area. Subsequently, when the contrast medium reaches the area, a contrast image is taken in that area. Thus the movement of the subject relative to the image pickup system precedes the flow of the contrast medium. In each of a plurality of areas, both a pre-contrast image and a contrast image are taken, and the former is subtracted from the latter.

The first technique is characterized in that, after the first movement of the examination table for the purpose of taking pre-contrast images in a plurality of areas, the examination table is returned to its starting position. The trouble is that, at the time of the second movement, it is difficult to stop the examination table exactly in the same positions as those in which the examination table was stopped at the time of the first movement. Consequently an artefact caused by positional deviation is liable to appear. Even if the examination table per se is free from positional deviation, the body of the subject is liable to deviate from its initial posture in the course of the long interval between the time when a pre-contrast image is taken in an area and the time when a contrast image is taken in the same area. Consequently an artefact caused by postural deviation is also liable to appear.

In the second technique, the examination table has only to be moved once from the uppermost to the downmost side of the contrast medium stream. There is no possibility, therefore, that an artefact caused by positional deviation will appear. It is difficult, however, to start moving the examination table at an opportune moment. The contrast medium may have already reached a second area disposed at the downstream side if the second area is late in coming into view of the image pickup system. In that event, the pre-contrast image will include an image of the contrast medium (i.e. an image of the blood vessel), which will be lost when this pre-contrast image is subtracted from a contrast image. Consequently the portion where the blood vessel exists turns white on an image obtained from such subtraction. As a matter of course, one may contend that the problem of this kind does not arise if the movement of the examination table is started at an opportune moment so that the second area may come into view of the image pickup system before the contrast medium reaches the area. However, this contention does not fit in with the reality, because there is great individual variation as to the velocity of flow of the contrast medium (i.e. the velocity of blood flow).

SUMMARY OF THE INVENTION

It is an object of the present invention to provide an X-ray photographic equipment for allowing a subject to undergo DSA in a plurality of areas of his body, these areas being disposed along the direction of flow of a contrast medium, the equipment being capable of delivering such an excellent image as to be free from an artefact caused by positional deviation or from the deficiency of image information.

The X-ray photographic equipment in accordance with the present invention comprises an X radiation means, an X-ray image pickup means facing to the X radiation means with the body of a subject adapted to be disposed therebetween so that X-rays transmitted by the body of the subject may be received as video signals by the X-ray image pickup means, a means for moving the X radiation means and the X-ray image pickup means relative to the body of the subject along the direction of flow of a contrast medium in the body of the subject and stopping these means in a plurality of positions, a means for obtaining a maximum value holding image and a minimum value holding image in each of the positions by processing the video singals representing a plurality of images obtained during the time when the X radiation means and the X-ray image pickup means are at a standstill in each of the positions, and a means for obtaining a difference between the maximum value holding image and the minimum value holding image.

The visual field of the X-ray image pickup means is moved relative to the body of the subject along the direction of flow of the contrast medium in the body of the subject, and stopped in a plurality of positions. During each time when the X-ray image pickup means is at a standstill in an area of the body of the subject, a plurality of images are obtained during the interval between the time when the contrast medium has not reached the area yet and the time when the contrast medium passes through the area. Video signals representing a plurality of images obtained in an area are processed in such a manner that the signal level of each picture element of an image is compared with the signal levels of the corresponding picture elements of other images obtained in the same area. An image which consists of picture elements having the highest signal levels is selected as a maximum value holding image, while an image which consists of picture elements having the lowest signal levels is selected as a minimum value holding image.

The maximum value holding image is represented by the most whitish picture elements. Consequently, even if the signal level undergoes variation in the course of the above-described comparison between the images, an image of the contrast medium moving in the body of the subject does not appear in the maximum value holding image.

On the other hand, the minimum value holding image is represented by the most blackish picture elements. Consequently, even if the signal level undergoes variation in the course of the above-described comparison between the images, a distinct image of the contrast medium moving in the body of the subject appears in the minimum value holding image.

The signal level of an image of the background does not undergo variation in the course of the above-described comparison between the images. Consequently the image of the background appearing in the maximum value holding image is on a level with that appearing in the minimum value holding image.

Consequently a difference between the maximum value holding image and the minimum value holding image represents an image of the contrast medium alone, i.e. an image of the blood vessel alone.

There is no possibility that an artefact caused by positional deviation will appear, because a plurality of image are obtained during the time when the visual field of the X-ray image pickup means is at a standstill relative to the body of the subject.

There is no problem even if the visual field of the X-ray image pickup means is not moved at an opportune moment, i.e., even if the starting of the visual field is delayed. In this case, when the visual field reaches the next area, the contrast medium may have already reached the upstream side of that area. However, the upstream side of an area is a portion from which the contrast medium flows away earliest. Therefore, an image of the contrast medium does not appear in the maximum value holding image at all. Even if the visual field of the X-ray image pickup means is not moved at an opportune moment, there is no possibility that an image of the contrast medium (i.e. an image of the blood vessel) will be lost.

A preferred embodiment of the present invention is hereinafter described with reference to the accompanying drawing.

BRIEF DESCRIPTION OF THE DRAWING

The signal figure of the drawing is a block diagram of an embodiment of the present invention.

DETAILED DESCRIPTION OF THE INVENTION

Figure 1:
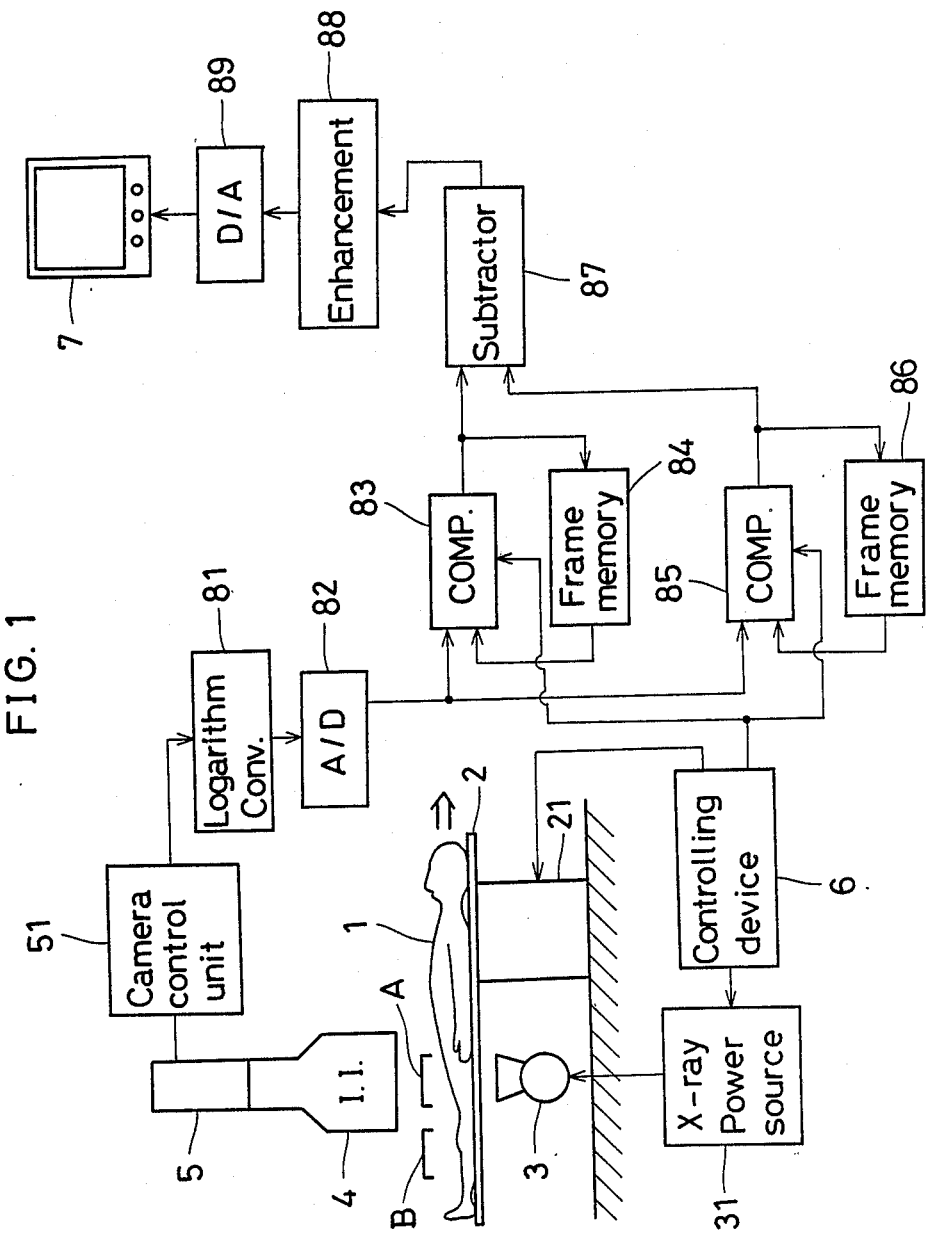

Referring to the drawing, a subject 1 is lying on an examination table 2, which is adapted to be moved in the lengthwise direction by a table reciprocating device 21 so as to allow the subject 1 to undergo DSA in two areas A and B of his body. When viewed from the standpoint of the direction in which a contrast medium flows, the area A is disposed at the upstream side and the area B is disposed at the downstream side.

The body of the subject 1 is interposed between an X-ray tube 3 and an image intensifier tube 4. The X-ray tube 3 is supplied with high voltage from a power source 31. An X-ray radiographic image is intensified and converted into a visible image by the image intensifier tube 4 and further converted into a video signal for television by transmission through an image pickup tube 5 and a camera control unit 51.

The table reciprocating device 21 and the power source 31 are controlled by a controlling device 6. The area A is exposed to the irradiation by X-rays from the X-ray tube 3 when the examination table 2 is at a standstill under the condition that the area A falls within the visual field of the X-ray image pickup means. Then a video signal about the area A is developed by the camera control unit 51. In the case of an ordinary X-ray fluoroscopic apparatus, this video signal is directly fed to, and displayed on the screen of, a television monitoring device 7.

In accordance with the present invention, the area A begins to be exposed to the irradiation by X-rays approximately at the time when a contrast medium injected into the subject 1 reaches the area A. Video signals representing a plurality of images are obtained before the contrast medium flows away from the area A. These video signals are fed to an analog-to-digital converter 82 through a logarithmic converter 81 and digitized. A frame of the digitized video signals is divided, e.g., into 512×512 picture elements or pixels. Fifteen bits are used for representing the gradation of each picture element. Then the digital video signals are fed to comparators 83 and 85. Signals having the same picture elements as these digital video signals are read out from the frame memories 84 and 86 and compared with these digital video signals in the comparators 83 and 85. The process of this comparison is started by a control signal taken from the controlling device 6 when the area A begins to be exposed to the irradiation by X rays. Prior to the starting of this process, the minimum (the most blackish) value for each picture element has already been stored in the frame memory 84, while the maximum (the most whitish) value for each picture element has already been stored in the frame memory 86. In the comparator 83, the signal level of each picture element of an image is compared with the signal levels of the corresponding picture elements of other images obtained in the same area, and picture elements having the highest signal levels are selected and stored in memory locations allotted to these picture elements in the frame memory 84. Picture elements having the lowest signal levels are selected by the comparator 85 and stored in the frame memory 86. Thus the process of holding a maximum value is carried out by the comparator 83 and the frame memory 84. When a plurality of images have been outputted from the camera control unit 51, a maximum value holding image which consists of picture elements having the highest signal levels is formed in the frame memory 84. likewise, the process of holding a minimum value is carried out by the comparator 85 and the frame memory 86. When a plurality of images have been outputted, a minimum value holding image is formed in the frame memory 86.

The maximum value holding image and the minimum value holding image are read out from the frame memories 84 and 86 respectively and subjected to subtraction in a subtractor 87. However, as illustrated in the drawing, the image data may be applied directly to the subtractor 87 from the comparator 83 and 85. A difference obtained from this subtraction is fed to a digital-to-analog converter 89 through a contrast enhancement circuit 88, returned to an analog signal, and fed to the television monitoring device 7. The maximum value holding image represents an image of the background alone, in which an image of the contrast medium moving in the body of the subject does not appear at all. On the contrary, the minimum value holding image represents all the loci of the contrast medium moving in the body of the subject. Therefore, the difference obtained from the above-mentioned subtraction represents an image of the contrast medium alone, i.e. an image of the blood vessel alone, which is displayed on the screen of the television monitoring device 7.

Irradiation by X-rays is temporarily stopped by the controlling device 6 when an image of the blood vessel has been obtained in the area A. A control signal is fed to the table reciprocating device 21 so as to move the examination table 2 to such an extent that the area B comes to be interposed between the X-ray tube 3 and the image intensifier tube 4. In the area B as in the area A, a maximum value holding image and a minimum value holding image are formed, and a difference therebetween is obtained and displayed. The above-described process of irradiation by X-rays, temporary stoppage thereof, and movement of the examination table is subjected to program control by the controlling device 6. Alternatively, only the stoppage of irradiation by X-rays and the movement of the examination table may be interlocked, the operator being free to decide on the timing of the stoppage of irradiation.

The processing can proceed in the same manner as mentioned above if there are further areas to be subjected to DSA in the succeeding positions.

Conditions of X-ray photographing are determined by carrying out test irradiation at the outset. It is necessary to determine such conditions for each area, because the thigh A and the shank B are different in thickness from each other. These conditions are stored in the controlling device 6.

The opening or aperture of an automatic diaphragm (not shown) mounted on the incidence side of the image pickup tube 5 is automatically changed so as to allow the quantity of rays incident on the pickup tube 5 to be kept constant. For this purpose, the opening or aperture of the automatic diaphragm is predetermined on the basis of starting conditions of X-ray photographing obtained from test irradiation. The predetermined opening or aperture of the automatic diaphragm is stored in a memory and automatically changed every time a new area comes to be interposed between the X-ray tube 3 and the image intensifier tube 4.

Although a leg is subjected to DSA in the above-described embodiment, an arm, head or neck may also be subjected to DSA in the same manner as mentioned above.

From the foregoing, it will be apparent that the contrast medium has only to be injected once for all into the body of a subject who is going to undergo DSA in a plurality of areas of his body by means of the X-ray photographic equipment in accordance with the present invention. This equipment is capable of delivering such an excellent image as to be free from the deficiency of indispensable image information or from an artefact caused by positional deviation of the examination table or postural deviation of the body of the subject. The timing for moving the examination table need not be so strict as to require the quick movement thereof or the delicacy in seizing an opportune moment.

We claim:

1. In an X-ray photographic equipment having image producing means for producing an image signal representing an image of a body of a subject from X-rays passing through the body, said equipment having moving means for producing relative movement between the image producing means and the body of the subject in the direction of flow of a contrast medium through the body, the improvement comprising:

control means for stopping said moving means at one of a plurality of positions and, while said moving means is stopped at said one position, repeatedly energizing said image producing means whereby a plurality of image signals each representing an image of said body, are produced;

means responsive to said image producing means for digitizing said image signals to produce frames of digitized image signals representing levels of pixels in said images ranging from black to white;

first frame memory means initially storing a frame image wherein the pixels are all of the black level;

second frame memory means initially storing a frame image wherein the pixels are all of the white level;

means responsive to said control means for comparing, pixel-by-pixel a frame image in said first frame memory means with a frame of digitized image signals and returning to said first frame memory means the pixels which comparison shows to be the whitest, to thereby develop a maximum value holding image;

means responsive to said control means for comparing, pixel-by-pixel, a frame image in said second frame memory means with a frame of digitized image signals and returning to said second frame memory means the pixels which the comparison shows to be the blackest, to thereby develop a minimum value holding image; and, difference means for determining the difference between said minimum value holding image and said maximum value holding image.

2. The improvement as claimed in claim 1 and further comprising image display means responsive to said difference means for displaying an image.

3. The improvement as claimed in claim 1 wherein said control means includes means for advancing said moving means and stopping it at a second position after the maximum value holding image and the minimum value holding image for said one position have been developed.

4. In an X-ray photographic equipment having image producing means for producing an image signal representing an image of a body of a subject from X-rays passing through the body, said equipment having moving means for producing relative movement between the image producing means and the body of the subject in the direction of flow of a contrast medium through the body, the improvement comprising:

control means for stopping said moving means at one of a plurality of positions and, while said moving means is stopped at said one position, repeatedly energizing said image producing means to produce a plurality of image signals each representing an image of said body;

digitizing means for converting each of said image signals into a frame of digital signals representing, pixel-by-pixel, the level of each pixel ranging from black to white;

first means responsive to said digitizing means, for producing signals representing a maximum value holding image wherein each pixel has a level equal to the level of the whitest of the corresponding pixels in each of said frames;

second means, responsive to said digitizing means, for producing signals representing a minimum value holding image wherein each pixel has a level equal to the level of the blackest of the corresponding pixels in each of said frames; and, difference means, responsive to said first means and said second means for producing difference signals representing the difference between the maximum value holding image and the minimum value holding image.

5. The improvement as claimed in claim 4 wherein said first means comprises a first frame memory and a first comparator, said first comparator having inputs connected to said first frame memory and said digitizing means and an output connected to said first frame memory.

6. The improvement as claimed in claim 5 wherein said first frame memory initially stores signals representing a reference frame wherein each pixel of the reference frame has said black level.

7. The improvement as claimed in claim 5 wherein said second means comprises a second frame memory and a second comparator, said second comparator having inputs connected to said second frame memory and said digitizing means and an output connected to said second frame memory.

8. The improvement as claimed in claim 7 wherein said second frame memory initially stores signals representing a second reference frame wherein each pixel of the second reference frame has said white level.

9. The improvement as claimed in claim 4 and further comprising visual display means responsive to said difference means for visually displaying an image representing the difference between the maximum value holding image and the minimum value holding image.

10. The improvement as claimed in claim 9 wherein said visual display means includes a digital to analog converter connected to said difference means, and a video display connected to said analog to digital converter.

11. An X-ray photographic equipment comprising:
X-radiation means;

X-ray image pickup means spaced from said X-radiation means so that a body of a subject may be disposed therebetween, said X-ray image pickup means facing said X-radiation means so that X-rays produced by said X-radiation means may be received by said X-ray image pickup means after passing through the body of the subject;

means for moving said X-radiation means and said X-ray image pickup means relative to the body of the subject along a direction of flow of a contrast medium in the body of the subject, said moving means including means for stopping said X-radiation means and said X-ray image pickup means at a plurality of positions;

digitizing means responsive to said X-ray image pickup means for producing digital signals representing an image of the body of said subject, said digital signals representing, for each of a plurality of picture elements comprising said image, a picture element level ranging from black to white;

a first frame memory initially storing a value representing the black level for each picture element of an image; a second frame memory initially storing a value representing the white level for each picture element of an image;

means responsive to said digitizing means for producing, at each position, a maximum value holding image by processing a plurality of images obtained between the time a contrast medium has not reached a position and the time it passes through the position, each of said plurality of images being compared with the first frame memory;

means for producing a minimum holding image, at each position, by processing a second plurality of images, each of said second plurality of images being compared with the second frame memory; and, means for obtaining a difference between the maximum value holding image and the minimum value holding image.

* * * * *